(12) United States Patent
Stephens, Jr.

(10) Patent No.: US 8,374,873 B2
(45) Date of Patent: Feb. 12, 2013

(54) TRAINING AND APPLYING PROSODY MODELS

(75) Inventor: James H. Stephens, Jr., Austin, TX (US)

(73) Assignee: Morphism, LLC, Austin, TX (US)

( * ) Notice: Subject to any disclaimer, the term of this patent is extended or adjusted under 35 U.S.C. 154(b) by 423 days.

(21) Appl. No.: 12/538,970

(22) Filed: Aug. 11, 2009

(65) Prior Publication Data

US 2010/0042410 A1 Feb. 18, 2010

Related U.S. Application Data

(60) Provisional application No. 61/088,130, filed on Aug. 12, 2008.

(51) Int. Cl.
G10L 13/08 (2006.01)
G10L 13/00 (2006.01)
G10L 15/04 (2006.01)
G10L 13/06 (2006.01)
G10L 15/26 (2006.01)
G10L 17/00 (2006.01)
G10L 15/00 (2006.01)
G10L 11/00 (2006.01)
G10L 21/06 (2006.01)
G10L 19/14 (2006.01)

(52) U.S. Cl. ........ 704/260; 704/261; 704/258; 704/254; 704/267; 704/266; 704/268; 704/269; 704/235; 704/247; 704/270; 704/275; 704/276; 704/249; 704/231; 704/246; 704/234

(58) Field of Classification Search ................ 704/260, 704/261, 235, 258, 254, 267, 266, 268, 269, 704/247, 270, 275, 276, 249, 231, 246, 234
See application file for complete search history.

(56) References Cited

U.S. PATENT DOCUMENTS

| | | | | |
|---|---|---|---|---|
| 6,961,704 B1 * | 11/2005 | Phillips et al. | | 704/268 |
| 7,039,584 B2 * | 5/2006 | Gournay et al. | | 704/221 |
| 7,054,815 B2 * | 5/2006 | Yamada et al. | | 704/267 |
| 7,136,816 B1 * | 11/2006 | Strom | | 704/260 |
| 7,617,105 B2 * | 11/2009 | Shi et al. | | 704/260 |
| 8,126,717 B1 * | 2/2012 | Strom | | 704/260 |
| 2004/0193421 A1 * | 9/2004 | Blass | | 704/258 |
| 2005/0060156 A1 * | 3/2005 | Corrigan et al. | | 704/270.1 |
| 2005/0182625 A1 * | 8/2005 | Azara et al. | | 704/236 |
| 2005/0267758 A1 * | 12/2005 | Shi et al. | | 704/260 |
| 2006/0074674 A1 * | 4/2006 | Zhang et al. | | 704/260 |
| 2006/0074678 A1 * | 4/2006 | Pearson et al. | | 704/267 |
| 2008/0059190 A1 * | 3/2008 | Chu et al. | | 704/258 |
| 2008/0270139 A1 * | 10/2008 | Shi et al. | | 704/260 |
| 2009/0076819 A1 * | 3/2009 | Wouters et al. | | 704/260 |
| 2009/0083036 A1 * | 3/2009 | Zhao et al. | | 704/260 |

* cited by examiner

*Primary Examiner* — Edgar Guerra-Erazo

(74) *Attorney, Agent, or Firm* — Hamilton & Terrile, LLP; Robert W. Holland

(57) ABSTRACT

Techniques for training and applying prosody models for speech synthesis are provided. A speech recognition engine processes audible speech to produce text annotated with prosody information. A prosody model is trained with this annotated text. After initial training, the model is applied during speech synthesis to generate speech with non-standard prosody from input text. Multiple prosody models can be used to represent different prosody styles.

12 Claims, 3 Drawing Sheets

TRAINING AND APPLYING PROSODY MODELS

CROSS REFERENCE TO RELATED APPLICATION

This application claims priority to U.S. Provisional patent application Ser. No. 61/088,130, filed Aug. 12, 2008, and entitled "Method and System for Training and Applying Prosody Models", the entire disclosure of which is incorporated herein by reference.

BACKGROUND OF THE INVENTION

1. Field of the Invention

The present invention relates to synthesizing audible speech from textual content. More specifically, the invention relates to the training and application of prosody models for speech synthesis.

2. Description of the Related Art

Text-to-speech (TTS) synthesis systems generate audible speech from text. These systems typically attempt to generate natural-sounding speech, speech that sounds as if a person had uttered it. For high-quality synthesized speech, natural, variable prosody is important. Without it, speech, especially speech of long duration, sounds flat and artificial. Furthermore, a single style of prosody will not provide the variability that is common in human speech. Different circumstances often suggest different prosody. For example, a newscaster's speech that reports breaking news will typically have different characteristics than speech at a corporate meeting. However, typical TTS systems do not provide for rich prosody styles. As a result, the speech these systems generate lacks the additional natural variation, emphasis, and color that richer prosody could provide.

SUMMARY OF THE INVENTION

These shortcomings create a need for TTS synthesis with varying, natural prosody. In accordance with the present invention, methods and systems for training and applying prosody models are provided to enable varying, natural prosody as part of TTS synthesis. More specifically, a speech recognition engine generates text annotated with prosody information from input audible speech, and this annotated text is used to train prosody models. A TTS system applies the prosody models during TTS synthesis to produce audible speech with natural, varying prosody as directed by the prosody models.

Since the syntax and/or semantics of the prosody information generated during speech recognition may not match that required by model training, this input prosody data can be translated to meet the requirements for training input. Similarly, the prosody model output syntax and/or semantics might not be acceptable for the speech synthesizer. In such a case, the prosody model output can be translated to the appropriate format.

Additionally, multiple prosody models can be created to correspond to natural speech patterns for different characters, moods, types of content, or contexts. For example, a system could train and apply an newscaster persona model, a "angry" model, a "frantic" model, or a "sleepy" model. Then speech synthesis control or markup could select one or more models to apply to some text. If multiple models are applied to a single piece of text (to be read by a frantic newscaster, for example), then any disagreement in prosody directives can be arbitrated based on various factors such a confidence indicators, subject matter, or keywords.

These components work together to provide natural changes in pitch, rate, and volume in speech synthesized from textual content. As a result, the speech is easier and more enjoyable to hear.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In the description that follows, the present invention will be described in reference to embodiments that train and apply prosody models for use in speech synthesis. More specifically, the embodiments will be described in reference to using speech recognition to process speech into text with prosody annotations, training one or more prosody models with that annotated text, applying one or more prosody models to generate prosody annotations for text to be synthesized, and synthesizing speech from that input text and prosody annotations. However, the scope of the invention is not limited to any particular environment, application, or specific implementation. Therefore, the description of the embodiments that follows is for purposes of illustration and not limitation.

In this description, the term "prosody" is used in a broad sense. It covers a wide range of speech characteristics. For example, prosody includes but is not limited to variations in speech rate, volume, pitch, and pauses. Furthermore, in this description, prosody also includes qualities related to inflection and intonation.

Figure 1:
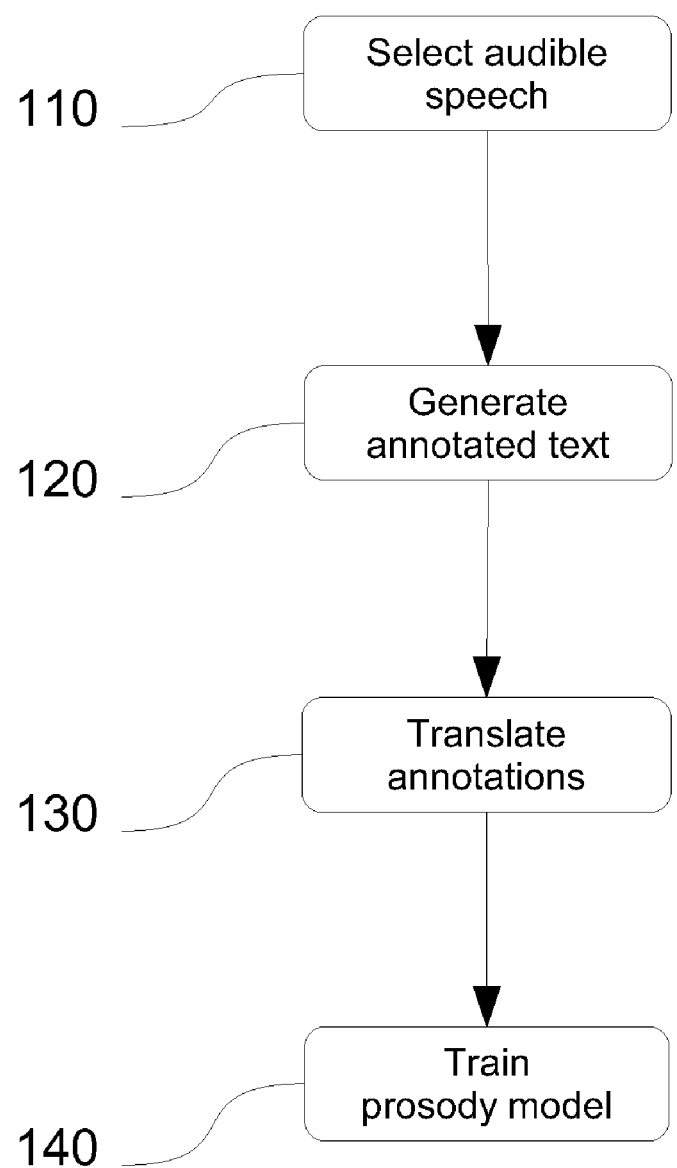
FIG. 1 is a flow chart illustrating steps performed for prosody model training.

FIG. 1 is a flow chart illustrating steps performed for prosody model training. In step 110, audible speech is selected for processing. This audio comprises spoken language uttered by a person, and the audio is originally captured by a microphone or other device for capturing sound. In typical embodiments, the audio is provided in a digital format such as a WAV or MP3. However, some embodiments process a real-time feed. In some of these embodiment, one or more speakers simply speak into a microphone, which captures the speech for the subsequent processing.

In addition to this input audible speech, typical embodiments also accept input parameters, which can characterize the input audio or influence the subsequent processing. More specifically, a typical embodiment can accept input parameters that indicate the type or identity of the speaker, the role of the speaker, and qualities about the speaker's speech. Some embodiments accept input parameters indicating the language of the speech as well as geographical information about the speaker. Examples:

1. Speaker: Larry
   Role: Attorney
2. Language: US English
   Emotion: Angry
3. Speaker: Arthur
   Condition: Drunk 4. Role: Newscaster
5. Speaker: Ray Wylie
   Region: Texas As a further example, some embodiment support emotional designators for prosody models. Candidate designators include "agitated", "deceitful", "amused", "serious", etc. Many other characterizations or designations are possible. More generally, prosody models and input parameters provide a flexible mechanism for characterizing the models to facilitate model selection during training as well as application.

Figure 2:
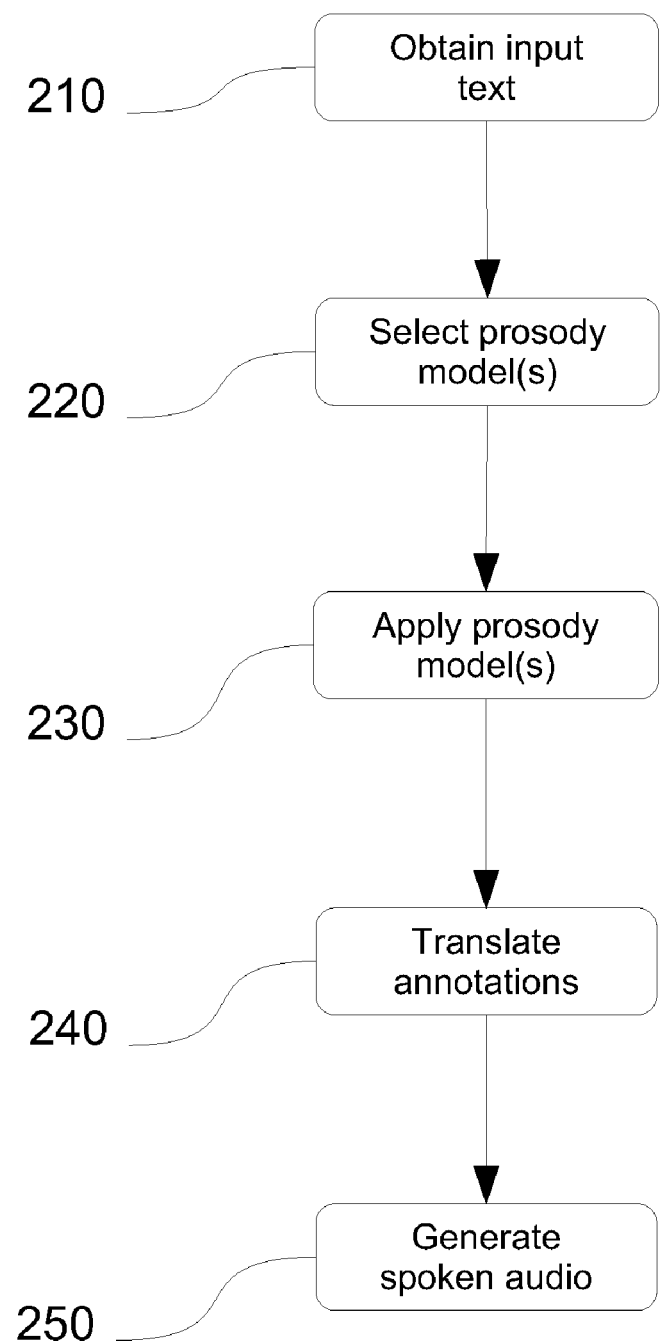
FIG. 2 is a flow chart illustrating steps performed for application of a prosody model.

Some embodiments accept an input parameter indicating how much weight the input should have in the target prosody model. If multiple inputs are used to train a single prosody model, each input can be weighted equivalently. Alternately, one or more inputs can be assigned specific weights or relative weights. During application, some models use weighting or similar information to choose among any alternate conflicting directives. Other models delegate the job of resolving conflicts to the speech synthesis engine. Discussion below in reference to FIG. 2 provides more information regarding model application.

Step 120 generates annotated text from the input audible speech. Typical embodiments use a speech recognition engine that is capable of outputting text with prosody annotations. These prosody annotations describe specific changes in prosody for specific segments of the output text. Syntax and semantics for the annotations vary from embodiment to embodiment. In some embodiments, the annotations are represented by a speech markup language. The following example output indicates that the rate of the speaker's voice decreased for the utterance of the word "excuse":

Well<prosody rate='42%'>excuse</prosody>me.

Prosody annotations will be more fully described below in reference to FIG. 3.

After generating the text with prosody annotations, step 130 translates that information into the format required for further processing in step 140, model training, which updates a target prosody model. For some embodiments, the language used to represent prosody annotations in step 120 is compatible with the input requirements for model training in step 140. Those embodiments do not need to perform the translation of step 130.

The translation of step 130 can range from simple textual substitutions to more complex manipulations. As an example, assume that the intermediate prosody annotation language used in the output of step 120 uses percentages to represent rate changes. "100%" corresponds to some default, fixed rate, and other percentages are used to compute rates relative to this default. Assume further that the prosody annotation language required for model training represents rate simply as "slow", "normal", or "fast". The example translation, supported by parameters, would map rates according to the following formula:

0-80%→slow 81-120%→normal

121+%→fast

Other examples type of translation involve mapping a high-level representation to a lower-level representation and vice versa. For example, some embodiments expand a high-level prosody annotation of 'emphasized speech' into lower-level directives for increased volume and pitch. Many other types of translation are possible.

A benefit of having an intermediate prosody annotation language is that, depending on specific requirements, this intermediate language and its supporting technology might not need not change when model training input requirements or input prosody language evolve. In some cases, only the translation needs to change with changes in model training technology. To provide additional abstraction, some embodiments execute a translation step between steps 120 and 130. The purpose of this translation is to translate a prosody annotation language specific to the speech recognition performed in step 120 into an abstract, intermediate prosody annotation language. Then changes, depending on their extent, in the speech recognition technology require more limited changes in subsequent processing. In some embodiments, there is no distinguished intermediate prosody annotation language. Instead step 130 serves as an of adapter the output of step 120 and the required input format of step 140.

Step 140 performs model training, also known as model updating. The target prosody model incorporates the text, or information derived from the text, and its prosody annotations into the model's current state. In most cases, the model's state is changed as a result. In typical embodiments, input parameters, such as weighting and other information, influence how the model's state is updated. With iterative training, a model evolves over time. More training refines the model's state, typically resulting in higher-quality output during model application.

FIG. 2 is a flow chart illustrating typical steps performed for application of a prosody model. Textual content to be processed is selected in step 210. Textual content comprises any information that can either be synthesized into audible speech directly or after intermediate processing. For example, content can comprise text marked up with a version of HTML (HyperText Markup Language). Other content formats are also possible, including but not limited to Extensible Markup Language (XML) documents, plain text, word processing formats, spreadsheet formats, scanned images (e.g., in the TIFF or JPEG formats) of textual data, facsimiles (e.g., in TIFF format), and Portable Document Format (PDF) documents. For content in the form of a graphical representation of text (e.g., facsimile images), some embodiments perform a text recognition step to extract textual content from the image.

Typical embodiments also accept parameters that affect processing. Many parameters for input to the model training process are appropriate as input for model selection and subsequent application. For example, a typical embodiment can accept input parameters that indicate the type or identity of the speaker, the role of the speaker, and qualities about the speaker's speech. Some embodiments accept input parameters indicating the language of the speech as well as geographical information about the speaker. As discussed above in reference to FIG. 1, other designations or characterizations are possible.

In some embodiments, model selection can associate different models with different segments of textual content. Furthermore, some embodiments use the textual content itself to inform model selection. In one such embodiment, keywords (or phrases) are associated with models. Models are then assigned to textual content, or a segment of textual content, based in part on occurrences of models' keywords in that textual content. Similarly, some embodiments associate models with tests, which are applied to textual content, input parameters, or related information, in order to inform model selection. For example, in some embodiments, textual content authored by a newspaper publisher could be assigned a prosody model for a new anchor persona. As another example, input text that contains a prevalence of legal terms might be processed with a prosody model for a trial lawyer addressing a jury.

In step 230, selected models are applied to the input textual content. This application produces prosody annotations associated with textual units in the textual content. These textual units include but are not limited to syllables, words, phrases, sentences, and larger textual units. As discussed above in reference to FIG. 1, the annotations cover a board range of prosody characteristics, and their syntaxes and semantics vary with embodiments and their prosody models.

Typical embodiments do not limit the assignment of a segment of textual content to zero or one models. Instead, these embodiments allow for multiple models to be associated with a single segment. In these cases, the embodiments typically perform an additional reconciliation step during or after applying the models in step 230. The process of reconciliation eliminates any conflicting annotations that result from application of multiple models. For example, two models, when applied to some segment of textual content, could produce both "slow" and "fast" speech rate annotations for a single phrase. Different reconciliation policies are possible. In some embodiments, one annotation is selected, and in some cases, that selection can be informed by annotations of annotations that indicate a model's confidence, weight, or similar measure of the target annotation. Extending the above example, model application could result in the following annotated text:

```
I didn't throw the cereal.
<prosody rate='fast' confidence='67%' model='Model 1'>
<prosody rate='slow' confidence='20%' model='Model 2'>
My sister did.
</prosody>
</prosody>.
```

One model, Model 1, indicates strong confidence in its annotation, while the other model, Model 2, considered its annotation to have less support in some sense. Note that the syntax for annotations of annotations can vary from embodiment to embodiment. In the example above, the annotations of annotations are collapsed into one. Some embodiments use additional markup tags (or elements) to associate confidence or other information with annotations in the scope of the tagged textual content. For example:

```
I didn't throw the cereal.
<model id='Model 1'>
  <annotation confidence='67%'>
    <prosody rate='fast'>
    My sister did.
    </prosody>
  </annotation>
</model>
```

This example contains three annotations: one for the prosody rate, one for the confidence for that rate (since the rate is the only annotation in scope), and one for the model that generated the annotations.

After step 230, typical embodiments perform an annotation translation step, step 240, similar to the translation discussed above in reference to FIG. 1. That description related to step 130 in FIG. 1 applies to step 230. In general, the primary goal of step 240 is to translate the annotations generated by model application into the language required for the speech generation step 250. As discussed in reference to FIG. 1, some embodiments use an intermediate annotation language with two translation steps: (1) model output to intermediate language and then (2) intermediate language to speech generation annotation language.

The last step, step 250, is the generation of speech from the annotated textual content. Some embodiments use conventional text-to-speech synthesis engines to perform this step. The output is spoken audio representing the portions of the input textual content. The prosody of the spoken audio reflects the annotations provided by one or more prosody models in step 230.

As discussed above, FIG. 2 illustrates steps 230 and 250 as distinct. However, some embodiments perform model application during speech synthesis. In these embodiments, step 230 is performed as part of step 250. Similar, the translation in step 240 can occur either as part of step 250 or step 230.

Figure 3:
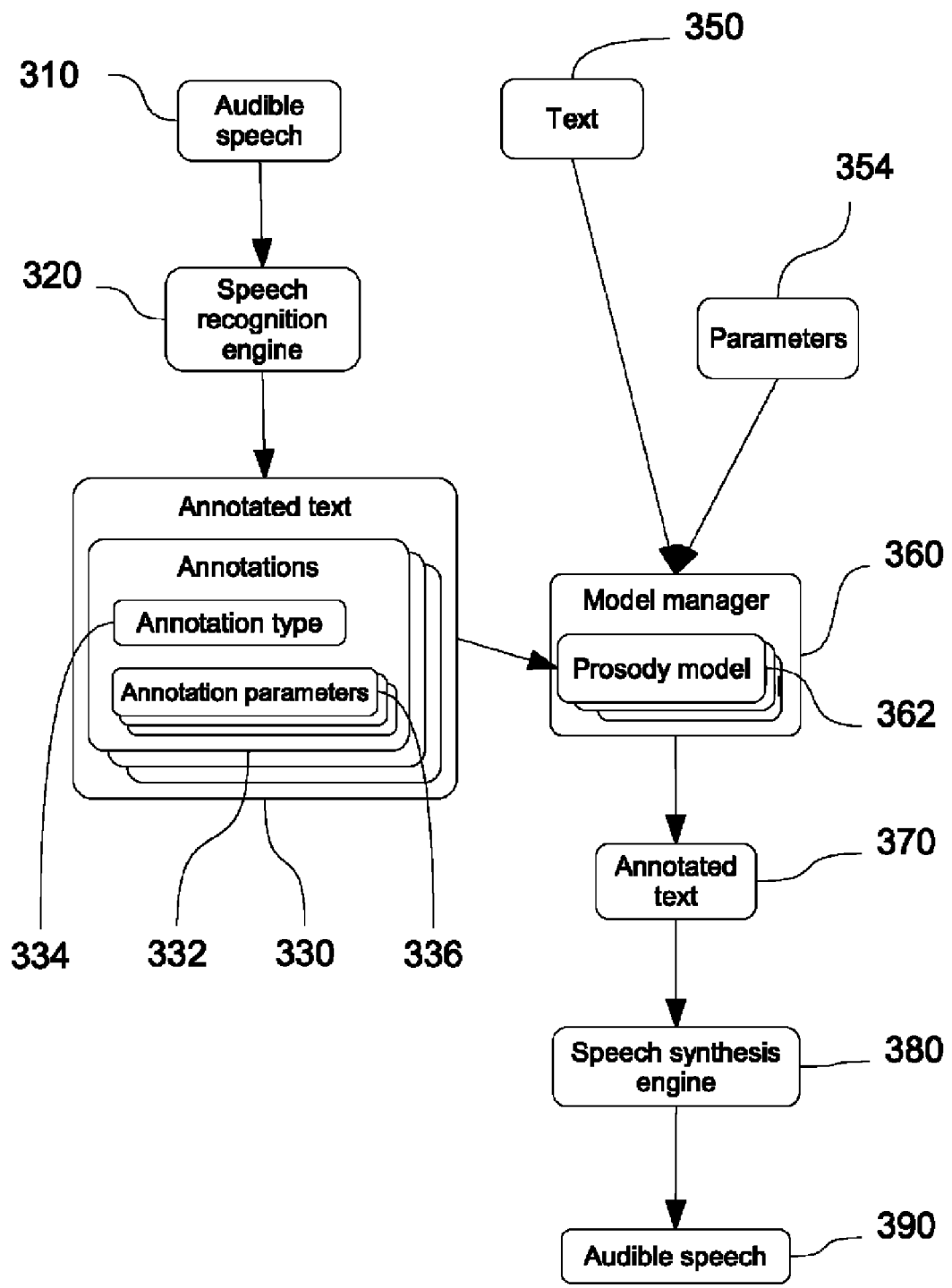
FIG. 3 is a block diagram illustrating a system using prosody models.

FIG. 3 is a block diagram illustrating a system using prosody models. Audible speech 310 is provided to speech recognition engine 320, which generates annotated text 330 that represents audible speech 310. Some embodiments use a microphone to capture audible speech 310 in realtime from a speaker's voice. Typical embodiments have audible speech transmitted or stored in a digital format. Common digital formats include MP3, WMA, and WAV.

Annotated text 330 includes segments or all of the textual content selected for later speech synthesis. Annotated text 330 also includes annotations 332. For annotations, embodiments use different languages, including standardized languages such as Speech Synthesis Markup Language (SSML) recommended by the World Wide Web Consortium (W3C), Java Speech Markup Language (JSML) promulgated by Sun Microsystems, SABLE, and Voice Extensible Markup Language (VXML) recommended by the W3C. Many other syntaxes and semantics are possible for conveying prosodic information in embodiments, and a given embodiment can support multiple annotation languages.

An annotation typically includes an annotation type 334 and zero or more annotation parameters 336. The annotation type 334 indicates the type of information conveyed by the annotation. In some embodiments, the annotation type, sometimes called the 'element' in markup languages, is the same for all prosody information. In these embodiments, the annotation parameters 336, which typically take the form of a set or list of property/value pairs, convey the specific prosody information for the annotation. In some embodiments, a single annotation, syntactically speaking, can convey multiple prosody characteristics. For example, in some embodiments the annotated text

```
<prosody rate='fast' volume='130%'>
My sister did it.
</prosody>.
``` indicates the sentence "My sister did it." should be uttered at a fast rate and elevated volume. With this syntax, there is one annotation type, simply 'prosody', and two annotation parameters, each consisting of a property/value pair. When multiple markup languages are used, namespaces are typically used to avoid ambiguity. The recommendations for SSML provide more examples and discussion of this type of approach.

Note that, as discussed above, some embodiments use an annotation language that is an extension of a standard markup language. In particular, some embodiments support model identification and confidence levels associated with prosody information, and some of these embodiments convey that data via additional properties of elements in tags. Alternately, some embodiments wrap standard tags in markup language specifically designed to provide this data about standard prosody tags.

Many other annotation languages, including ones not based on traditional markup syntaxes, are possible. As discussed above in reference to translation steps in FIG. 1 and FIG. 2, some embodiments use an intermediate annotation language, and many of those embodiments use an intermediate annotation language which may be more expressive than current input or output annotation languages the embodiments utilize at the time.

The annotated text 330 is then provided to a prosody model 362 for training. As discussed above in reference to FIG. 1, some embodiments also provide or receive input parameters to influence training. Based on annotated text 330, the targeted prosody model updates its state. This training can be iterative, where the same model is updated repeatedly with different annotated texts resulting from different audible speech 310 inputs.

Many embodiments support training multiple models from a single input audible speech 310. For example, assume parameters associated with some particular audible speech 310 specify that that audible speech was uttered by a person named Larry who is an attorney. An example embodiment might have a model for "Larry" and a model for an attorney. In such an example, both models could be trained by that audible speech. Additional audible speech 310 might be designated as simply "attorney" speech, which would only be provided, through annotated text 330, to the "attorney" model. In this manner, some embodiments build up an inventory of prosody models with designated characteristics, often in combinations: Larry, who happens to be an attorney; a generic attorney; a salesperson; an angry speaker; a politician; a drunk; a drunk and angry politician; etc. These embodiments select the target prosody model(s) 362 for training based on information related to audible speech 310, annotated text 330, input parameters, or related information.

Some embodiments choose target prosody models automatically based on keywords or other textual features of annotated text. An example embodiment maintains associations between keywords and characteristics and characteristics and models—or, more directly, between keywords and models. When the embodiment support for a model's keywords in annotated text 330, the embodiment chooses that model as one of the target models. Some embodiment support more elaborate automated model choosing schemes, which are often implemented in model manager 360.

For example, some embodiments update state associated with a targeted model training session based on the annotated text 330 used in that training session. In these embodiments, annotated text not used for a model is often also used to update this associated state. Then the embodiment can use that associated state to evaluate the appropriateness of some new annotated text for that model. Initially, model selection is typically based on input parameters that are provided manually. For example, a user specifies that some audible content 310 is Larry's speech, who is a lawyer. With more training, the embodiment builds up a lexicon of words or phrases statistically associated with "lawyer" audible speech. With this data, the embodiment can analyze annotated text 330 that has not been fully characterized manually. This analysis looks for relevant similarities between previously-provided annotated texts and the current candidate annotated text. The analysis also typically considers previous annotated texts that were deemed inappropriate for the model. In this way, the embodiment can learn what text is appropriate for certain models. Other approaches to automatic model selection are also possible. The field of machine learning provides several classes of relevant algorithms, such as clustering and association discovery, as well as specific algorithms that can facilitate this function.

Learning target training model selection, using manual seeding of appropriate and inappropriate audible speech 310 and associated annotated text 330, enables processing of large corpora with minimal manual intervention. As a result, rich libraries of high-trained prosody models can be produced economically.

Furthermore, this model selection capability can be applied during model application as well as in model training. During model application, input text 350 is provide for processing into audible speech. In that process, zero or more prosody models 362 are selected, and the model manager 360 or other component can partially or fully automate that selection using the facility for learned model selection described above. As an example, a user could submit some text for speech synthesis. Assume that speech included a disproportionate number of legal terms. If the embodiment had learned how to recognize text related to legal topics and if that embodiment further had one or more models associated with that kind of text, the embodiment would automatically use those "lawyer" prosody models.

Model application begins with input text 350 and optional input parameters 354. More generally, text 350 is any textual content as described in reference to step 110 of FIG. 1 and step 210 in FIG. 2. Parameters 354 are described above as well. Both text 250 and parameters 354, if available, are provided to model manager 360, which selects prosody models from the embodiments library based on text 350 and, if provided, parameters 354. The model selection process is described in detail above. Some embodiments have only one prosody model. In these cases, the model manager's in model selection is trivial. The model manager, or another component, then applies the selected models to text 350. The result is annotated text 370, also described previously. Some embodiments then translate annotated text 370 in preparation for input to the speech synthesis engine 380. Speech synthesis engine 380 generates audible speech 390 with prosody based on the annotations of annotated text 370.

FIG. 3 is a logical, rather than physical, illustration. FIG. 3 illustrates single boxes for certain components which, when deployed in a some large-scale production embodiments, are deployed across many distinct computing devices. In contrast, some small-scale embodiments deploy multiple components on a single computer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof it will be apparent that modifications and variations are possible without departing from the scope of the invention defined in the appended claims.

What is claimed is:

1. A computer-implementable method for synthesizing audible speech, with varying prosody, from textual content, the method comprising:
   generating first texts annotated with prosody information, the first texts and prosody information generated by a speech recognition engine applied to speech inputs and parameters;
   training an inventory of prosody models with the first texts annotated with prosody information, wherein the prosody models are associated with the parameters;
   selecting a subset of multiple prosody models from the inventory of prosody models;
   associating prosody models in the subset of multiple prosody models with different segments of a second text;
   applying the associated prosody models to the different segments of the second text to produce prosody annotations for the second text;
   reconciling conflicting prosody annotations from multiple prosody models associated with a segment of the second text; and
   synthesizing audible speech from the second text and the reconciled prosody annotations.

2. The method of claim 1, wherein the parameters comprise the roles and geographical locations of multiple speakers who uttered the speech inputs.

3. The method of claim 2, wherein the parameters further comprise emotional designators.

4. The method of claim 2, wherein the parameters further comprise relative weights.

5. The method of claim 4, wherein the parameters comprise keywords and model selection is based on the keywords in the second text.

6. The method of claim 5, wherein each prosody model is associated with a confidence level.

7. The method of claim 6, wherein the reconciliation is based on a reconciliation policy.

8. The method of claim 7, wherein the reconciliation policy selects annotations based on the confidence levels of the models that produced conflicting annotations for the segment of the second text.

9. A computer-implementable method for synthesizing audible speech, with varying prosody, from textual content, the method comprising:
   selecting multiple prosody models from a prosody model inventory based on keywords in a first text annotated with prosody information and parameters;
   training the multiple prosody models with the first text annotated with prosody information;
   choosing a subset of multiple prosody models from the prosody model inventory;
   associating prosody models in the subset of multiple prosody models with different segments of a second text;
   applying the associated prosody models to the different segments of the second text to produce prosody annotations for the second text;
   reconciling conflicting prosody annotations for a segment of the second text based on confidence levels and prosody model weights; and
   synthesizing audible speech from the second text and the reconciled prosody annotations.

10. The method of claim 9, wherein a model manager chooses the subset of multiple prosody models and the model manager applies the associated prosody models to the different segments of the second text.

11. The method of claim 10 further comprising:
    building lexicons of words that are statistically associated with the prosody models and the parameters and
    analyzing the second text using the lexicons to inform the association of prosody models with the different segments of the second text.

12. The method of claim 11 wherein the model manager uses the lexicons and input text to select prosody models for model training.

* * * * *